United States Patent
Hayard et al.

[19]

[11] Patent Number: 5,897,156
[45] Date of Patent: Apr. 27, 1999

[54] METHOD OF PROTECTING A PLANETARY ROVER VEHICLE

[75] Inventors: Michel Hayard, Toulouse; Jean-Claude Anne, Auzeville, both of France

[73] Assignee: Alcatel Espace, Cedex, France

[21] Appl. No.: 08/707,942

[22] Filed: Sep. 10, 1996

[30] Foreign Application Priority Data

Sep. 11, 1995 [FR] France ................................. 95 10607

[51] Int. Cl.$^6$ .................................................. B60J 11/00
[52] U.S. Cl. ........................... 296/136; 135/88.05; 901/1
[58] Field of Search ............................. 296/136; 901/1, 901/49; 135/88.03, 88.09, 88.01, 88.05

[56] References Cited

U.S. PATENT DOCUMENTS

| | | | |
|---|---|---|---|
| 2,571,362 | 10/1951 | Hervey | 296/136 |
| 3,277,621 | 10/1966 | Merdich | 296/136 X |
| 3,600,866 | 8/1971 | Griffith | 296/136 X |
| 4,166,598 | 9/1979 | Seifert et al. | |
| 4,314,682 | 2/1982 | Barnett et al. | |
| 4,944,321 | 7/1990 | Moyet-Ortiz | 296/136 X |
| 5,013,079 | 5/1991 | Ho | 296/136 |
| 5,501,502 | 3/1996 | Wang | 296/136 |

OTHER PUBLICATIONS

Kozlov et al, "Mobile Lunar Base Project", *Journal of the British Interplanetary Society*, vol. 48, No. 1, Jan. 1995, London, GB, pp. 49–54.

Burkhalter et al, "Lunar Roving Vehicle: Historical Origins, Development and Deployment", *Journal of the British Interplanetary Society*, vol. 48, No. 5, May 1995, London, GB, pp. 198–212.

*Primary Examiner*—Joseph D. Pape
*Attorney, Agent, or Firm*—Sughrue, Mion, Zinn, Macpeak & Seas, PLLC

[57] ABSTRACT

Method of protecting a planetary rover vehicle, that travels in a manner that is at least partially autonomous, against an exterior environment that has become hostile wherein the vehicle takes shelter and emerges from shelter against the exterior environment of its own accord, respectively in response to first and second events delimiting a period in which the exterior environment is hostile. The vehicle is therefore isolated from the exterior environment during this period.

14 Claims, 4 Drawing Sheets

METHOD OF PROTECTING A PLANETARY ROVER VEHICLE

BACKGROUND OF THE INVENTION

1. Field of the Invention

The present invention concerns a vehicle adapted to travel on the surface of a planet such as Mars or the Moon in a manner that is at least partly autonomous. A vehicle of this kind, operating as a robot in the true sense, is able to move around, to circumvent obstacles and to carry out scientific, exploration and other tasks on the surface of the planet in question, for example. It is able to operate over a long period by accumulating solar energy.

To be more precise the invention is directed to providing a method of protecting a vehicle of this kind when the exterior environment in which it operates becomes hostile, leading to the possibility of irreversible material damage to some parts of the vehicle. On the Moon, for example, the duration of the night is about 14 days, during which the temperature falls to particularly low values causing failure of the electronic circuits and the battery of the vehicle, for example, making the vehicle totally inoperative, this often constituting total loss of the vehicle since it cannot be recovered and repaired. To give another example, there are frequent sand storms on Mars which could obliterate the vehicle.

A vehicle of this kind intended for a lunar mission is of very high cost and it is prudent to protect it during each period in which the exterior environment is hostile and compromises its survival, so that the vehicle can continue its current mission after any such period.

2. Description of the Prior Art

The prior art provides two solutions to the problem of protecting a vehicle during the lunar night. The first of these prior art solutions consists in a plurality of heater elements powered by the battery of the vehicle and disposed near the most vulnerable devices and circuits. The heater elements are energized as soon as the lunar night begins. To provide good protection of the sensitive equipment without requiring a considerable amount of energy it is necessary to provide it with effective thermal protection, in other words to insulate it from the exterior environment using highly insulative materials. This solution conflicts with another objective in the construction of any such vehicle, namely optimal evacuation of heat from the electric circuit during operation of the vehicle. In practise it is undesirable to use these insulative materials. However and if the insulative materials are not then this first solution requires the use of batteries occupying a very large volume, which is also incompatible with the nature of the vehicle intended to transport them.

The second solution uses a radio-isotope heat generator typically consisting of a mass of plutonium that disintegrates in a nuclear reaction to generate heat energy. Apart from its drawbacks of very high cost and difficulty of implementation, this solution has to be rejected because of its nuclear pollutant nature.

The invention is therefore directed to overcoming the drawbacks of the prior art by providing a viable method of protecting a planetary rover vehicle against an exterior environment that has become hostile.

SUMMARY OF THE INVENTION

In accordance with the invention, a method of protecting a planetary rover vehicle against an exterior environment that has become hostile, adapted to travel in a manner that is at least partially autonomous comprises the steps of:

the vehicle itself taking shelter and emerging from shelter against the exterior environment respectively in response to first and second events delimiting a period in which said exterior environment is hostile, so that said vehicle is isolated from said exterior environment during the period.

During the delimited period resources on the vehicle are preferably placed at least partially on standby.

The method may further comprise, after the first event, the step of:

putting in place solar energy capture means, preferably with an orientation directed towards a predicted point of appearance of the sun.

In accordance with the invention the first event is selected from:

measure by measuring means of the vehicle of a temperature below a predetermined threshold, reception by receiver means on the vehicle of a command to seek shelter, and the expiry of a time-delay.

In like manner, the second event is selected from:

measurement by measuring means of the vehicle of a temperature above a predetermined threshold temperature drop, reception by receiver means on the vehicle of a command to leave shelter, and the expiry of a time-delay.

Heating means associated with the vehicle are advantageously activated during the period.

In a preferred embodiment of the invention the steps of the vehicle taking and emerging from shelter of its own accord respectively consist in deployment of a cover around the vehicle and folding of the cover.

In a second embodiment the steps of the vehicle taking and emerging from shelter of its own accord respectively consist in the vehicle travelling to and entering a shelter provided for that purpose and the vehicle emerging from the shelter.

Other features and advantages of the present invention will emerge more clearly from a reading of the following description with reference to corresponding accompanying drawings.

DETAILED DESCRIPTION OF THE PREFERRED EMBODIMENTS

Figure 1A:
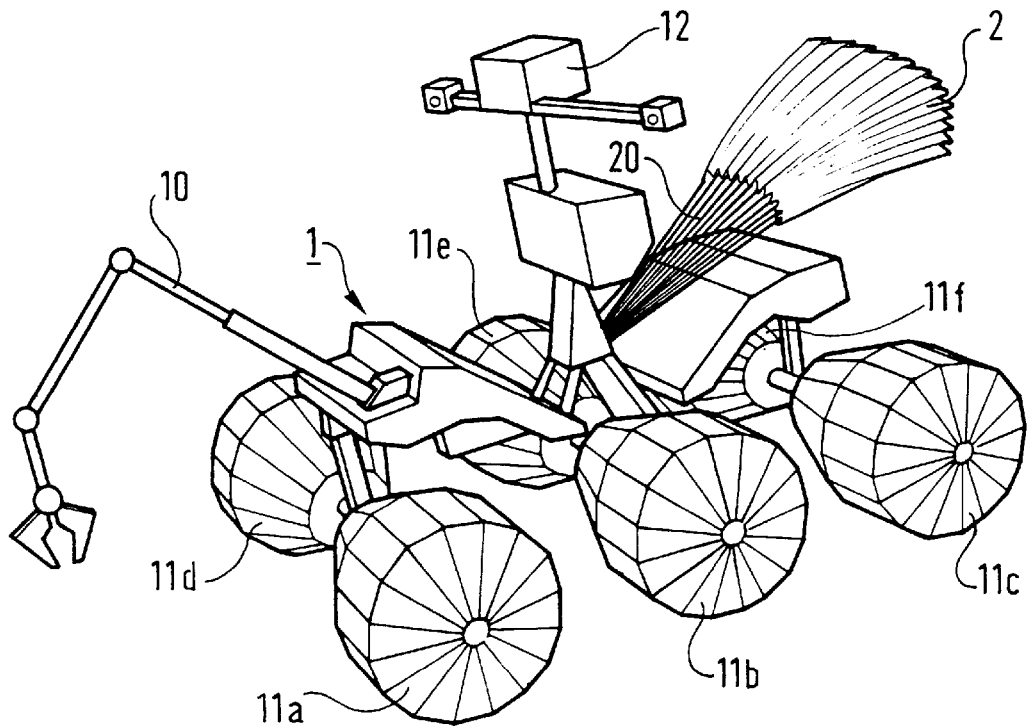
FIGS. 1A through 1D show successive states of the planetary rover vehicle taking shelter by deploying a cover designed to cover it.

Referring to FIG. 1A, a robot planetary rover vehicle implementing the method of the invention typically includes a main body 1 articulated at three points to respective axles at the opposite ends of each of which are mounted respective pairs of wheels 11a and 11d, 11b and 11e, 11c and 11f. The main body is designed, for example, to carry energy storage units in the form of batteries, electronic circuits, solar panels and mechanical units for propulsion of the vehicle. An articulated mechanical arm 10 and a stereo camera 12 are also typically mounted on the main body. The arm 10 is for handling, manipulation, operations, etc., and the stereo camera supplies two images to an image processing unit (not shown) adapted to produce a three-dimensional representation of the exterior environment for locating objects, detecting obstacles, etc. In one variant of the method of protecting the vehicle, described in more detail below, the vehicle is equipped with a cover 2 in the shape of a parachute fixed to the vehicle by means of telescopic rods 20 articulated to the vehicle at a substantially central point.

Figure 1B:
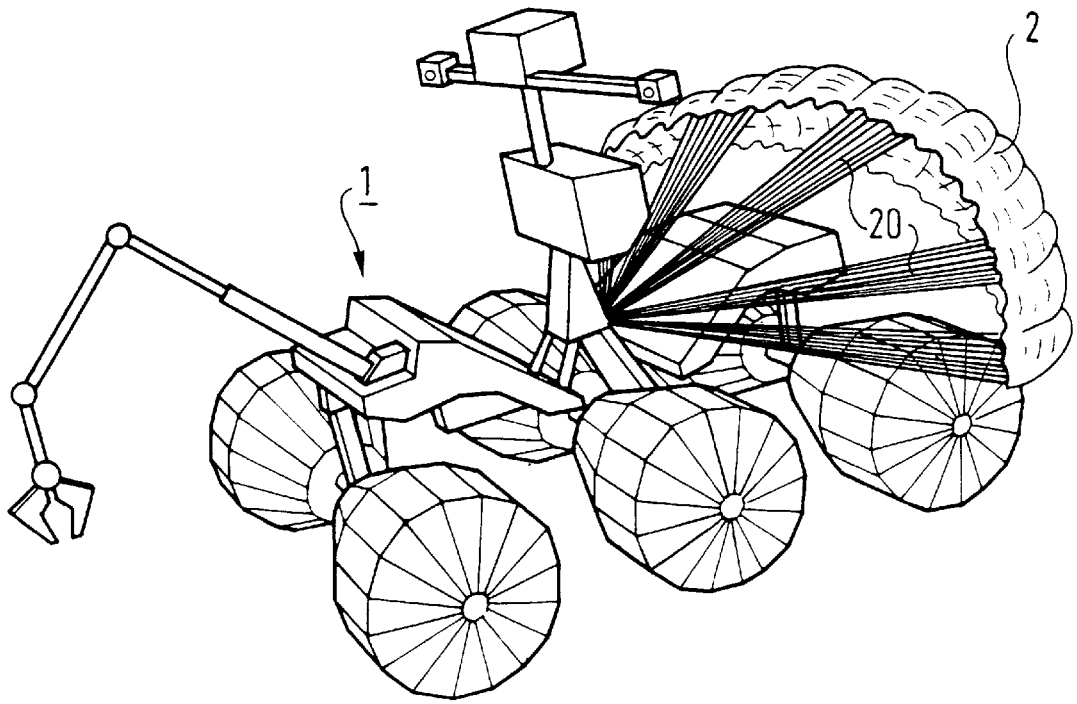
Figure 1C:
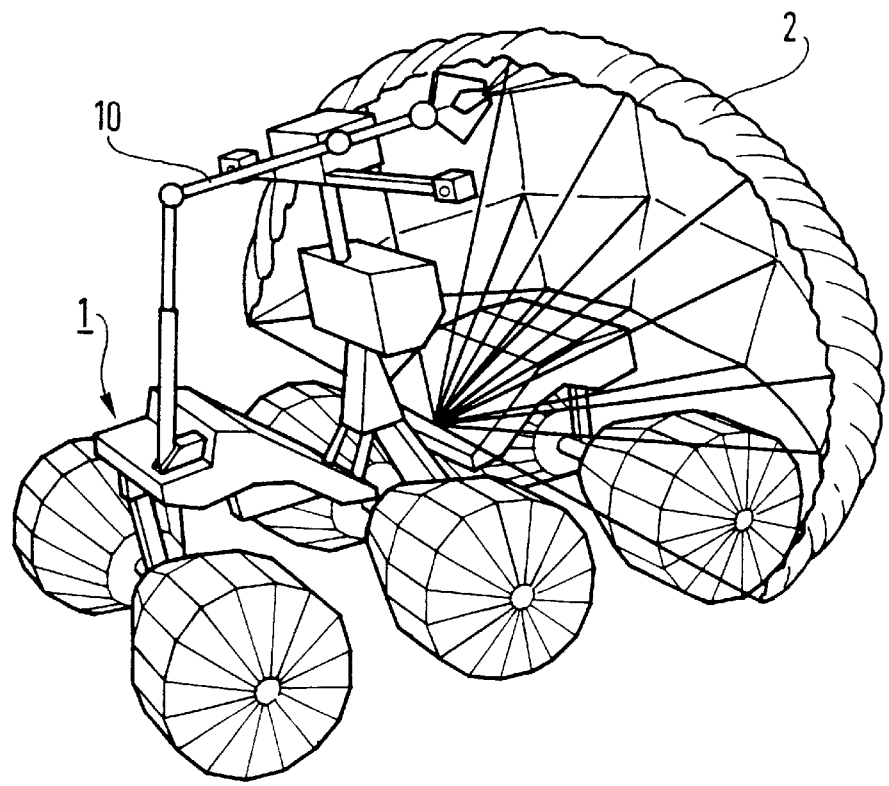
Figure 1D:
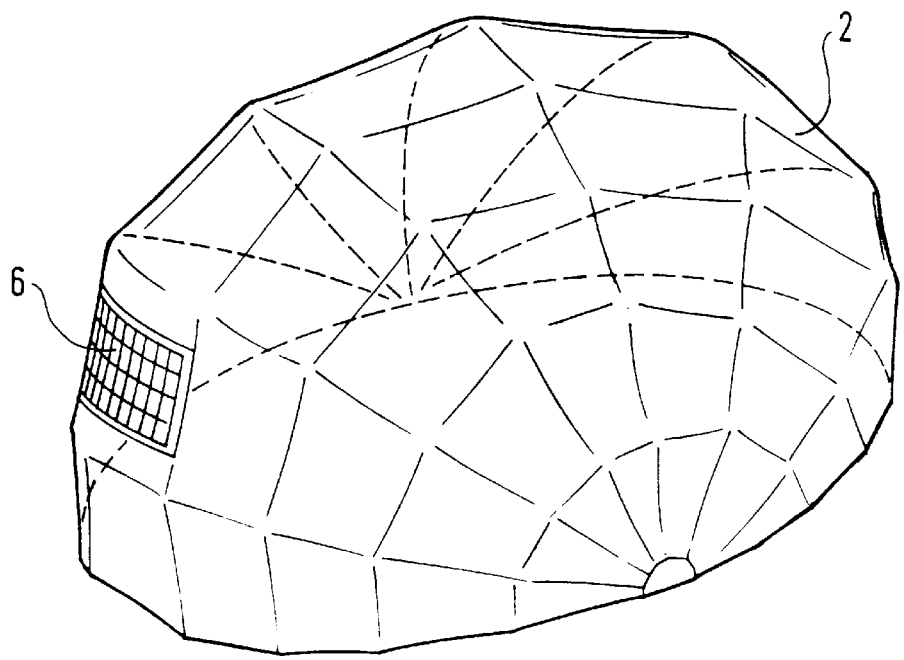
Figure 2:
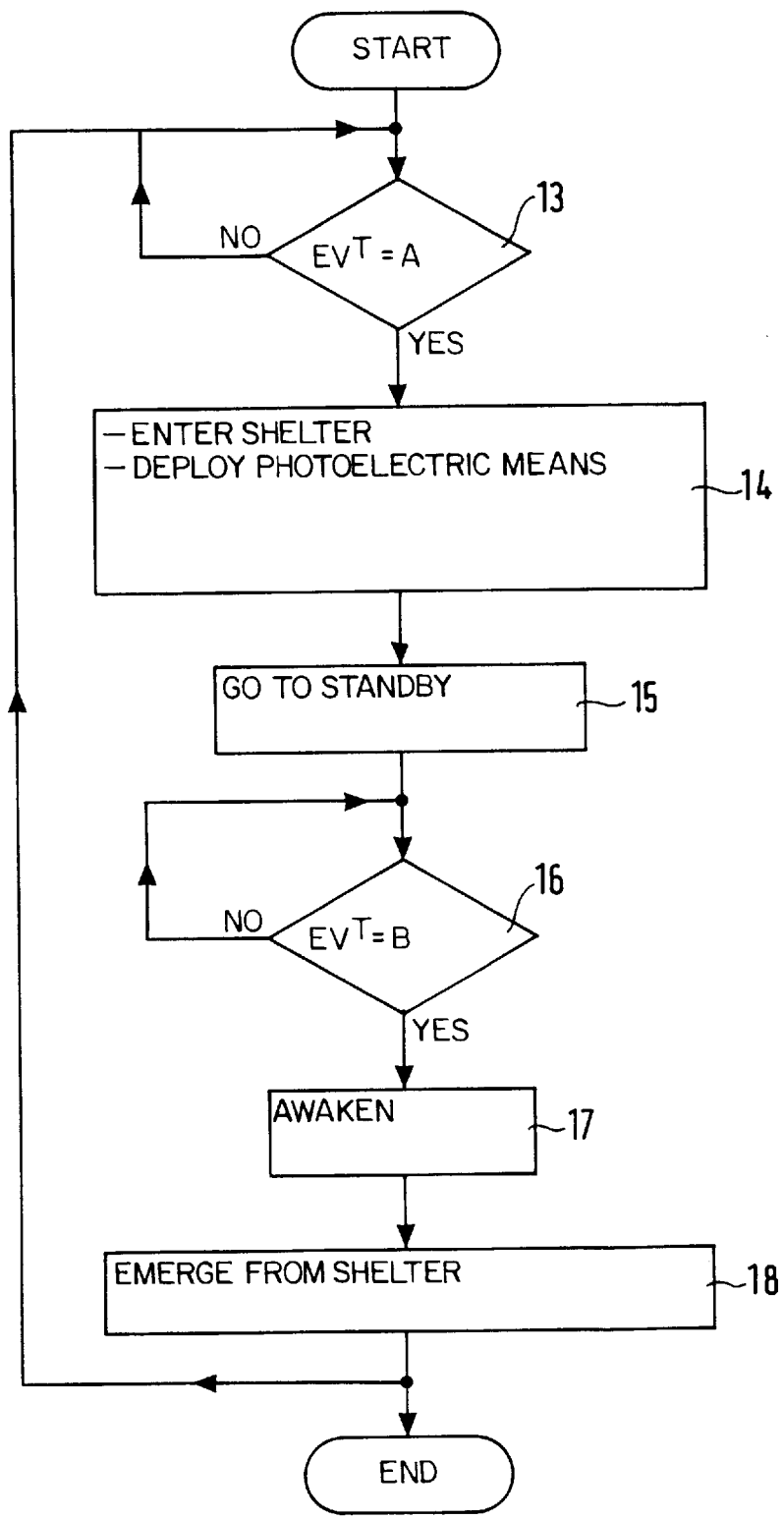
FIG. 2 shows an algorithm of the invention for protecting a planetary rover vehicle.

FIG. 2 shows an algorithm for use of the method in accordance with the invention for protecting the vehicle. This algorithm is installed in processor means on the vehicle. Assume that the vehicle is initially moving in a non-hostile environment. The operations required to protect it are initiated in response to a given event A. Means are accordingly provided in the vehicle for detecting an event of this kind (step 13). To protect the vehicle against the cold of the lunar night, for example, these means may comprise temperature measuring means. The event A is then the measurement by these measuring means of a temperature below a predetermined threshold temperature. In a different embodiment the event A may be the reception by receiving means in the vehicle of a command to take shelter. This command is transmitted by radio from a remote station for remote control of the vehicle, for example. In a further embodiment, given the periodic character of the onset of the lunar night, the vehicle may include time measuring means and take shelter at the end of a given time-delay coinciding with the start of the lunar night. As soon as the event A occurs, the vehicle takes shelter (step 14). Various ways of protecting the vehicle by taking shelter are feasible. A first way has the vehicle deploy the cover 2 around itself, as shown in FIGS. 1B through 1D. To achieve this, as shown in FIG. 1B, the telescopic rods 20 are deployed and open out in a "conical bundle" from the point of articulation of the rods, which is substantially centrally located on the vehicle. The cover 2 when opened out in this way extends around the vehicle and covers it entirely, as shown in figure ID. The manipulator arm 10 can advantageously be used to cover the vehicle in this. The gripper at the end of the arm take hold of the cover at some point thereon in order to pull it from the back of the vehicle towards the front of the vehicle. The end result is that the vehicle is totally insulated by the cover 2, typically made of Mylar, which rests on the ground around the vehicle. In a different embodiment, the vehicle takes shelter by travelling to a shelter provided for this purpose. To this end the vehicle stores the location of a "garage" to which it goes for protection as soon as it needs to take shelter because the exterior environment has become hostile.

When the vehicle is in shelter and therefore protected, it cannot receive solar energy to power subsequent movement around the planet and it is therefore advantageous to deploy solar energy capture means when it takes shelter which are exposed to the sun even when the vehicle is in shelter. The energy stored in the vehicle can be critically weakened during the period in which it is in shelter. It is then impossible for the vehicle to emerge from shelter, leading to permanent immobilization of the vehicle and therefore its loss. To remedy this drawback, the invention provides for the vehicle to deploy solar energy capture means in response to the event A that are preferably oriented towards a predicted point at which the sun will appear when the exterior environment is no longer hostile. As shown in FIG. 1D, the cover 2 may to this end incorporate a transparent material window against the inside face of which the vehicle inside the shelter presses solar energy capture means 6 in the form of a solar panel. This solar panel 6 is carried by the main body 1 of the vehicle and is actuated to press it against the transparent window. In the embodiment in which the vehicle takes shelter by travelling to a shelter provided for this purpose, before it enters the "garage" providing this shelter the vehicle may put down, outside the shelter, solar energy capture means that are appropriately insulated and connected to the vehicle by a connecting wire.

Figure 4:
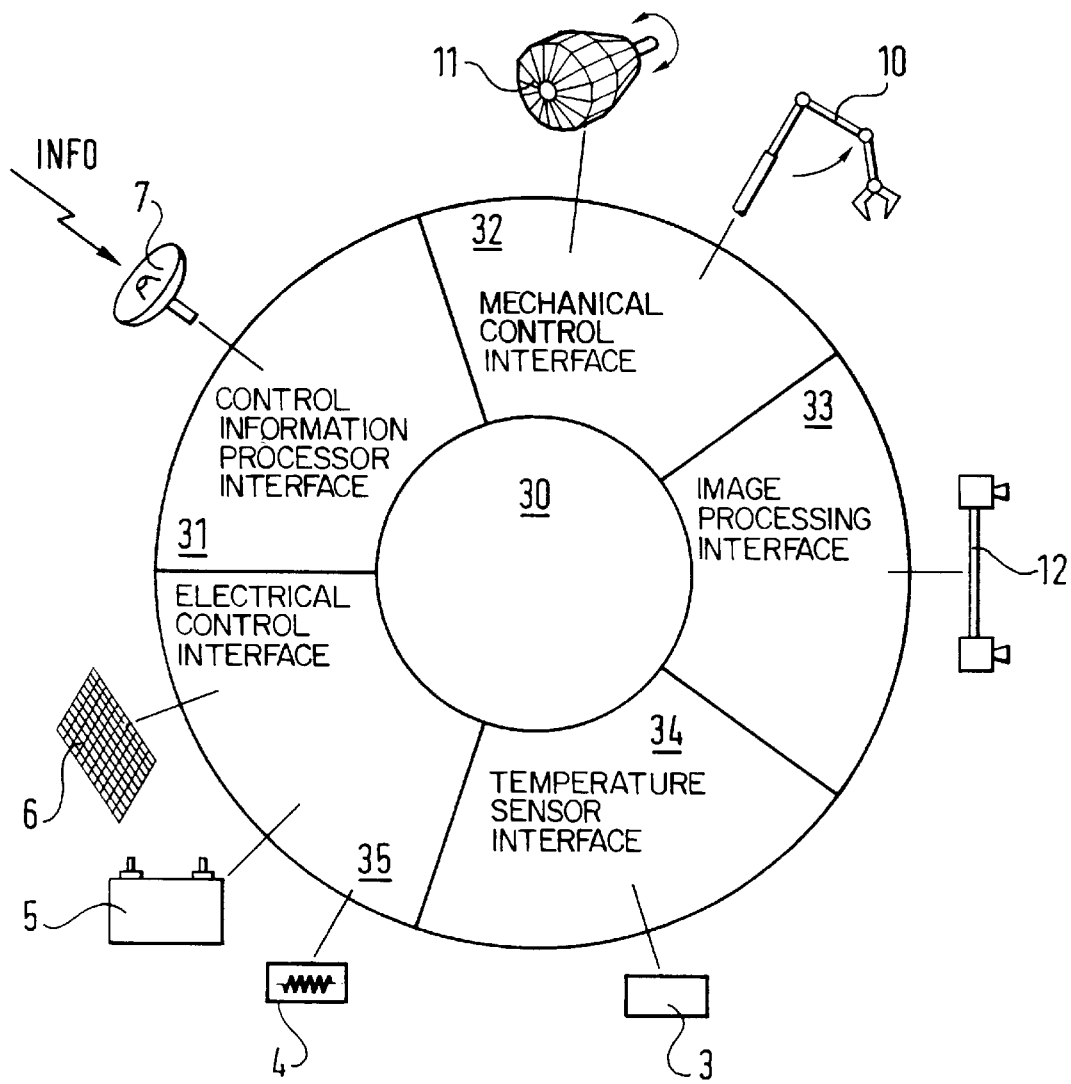
FIG. 4 is a functional block schematic of the planetary rover vehicle used to explain how the method of the invention is put into effect.

In step 15 in FIG. 2, as soon as the vehicle has taken shelter and, where applicable, the solar energy capture means exposed to the sun have been placed in position, the vehicle goes at least partially to a standby condition. This is explained with reference to FIG. 4. As shown in this functional block schematic, the means on board the vehicle include: (1)—a core unit 30 implementing the basic and intelligent functions of the vehicle, (2)—a radio processing interface 31 receiving control information INFO via an antenna 7, such as a command to take shelter transmitted from a remote station on the planet, for example, (3)—a mechanical control interface 32 by which the vehicle is moved and operated, for example driving its wheels 11 and operating its manipulator arm 10, (4)—an image processing interface 33 adapted to receive and to process the two stereo images supplied by the camera 12, (5)—a temperature sensor interface 34 connected to a temperature sensor 3 and used in the embodiment in which the event instigating the vehicle taking shelter is the measurement of a temperature below a predetermined threshold temperature, and finally (6)—an electrical control interface connected to an energy capture solar panel 6, a battery 5 and a heater element 4. In an advantageous embodiment of the invention the heater element is activated for all of the period for which the vehicle is in shelter, to guarantee a minimal temperature inside the shelter if the exterior environment has become hostile because of a particularly low exterior temperature, for example during the lunar night. In the FIG. 4 schematic, the core unit 30, which is in the form of an automatic controller, monitors each of the interfaces to guarantee correct operation of the vehicle and to enable it to operate on the surface of the planet. The vehicle puts itself at least partially on standby by selective deactivation of some interfaces or some interface subsystems. For example, in the embodiment in which the event causing the vehicle to take shelter is the measurement of a temperature below a predetermined threshold temperature, the temperature sensor interface 34 and the electrical control interface 35 subsystem associated with the battery 5 remain active, the interfaces 31, 32 and 33 being deactivated throughout the period for which the vehicle is in shelter. As an alternative to this, the core unit selectively deactivates and activates certain interfaces that have respectively become of no utility or of some utility for implementation of a given function at predetermined times during the period for which the vehicle is in shelter.

At the end of the critical period in which the exterior environment is hostile to the vehicle, an event B "awakens" the vehicle (step 16, FIG. 2) to advise it that the exterior environment is again viable for the vehicle. This event B can be:

measurement by the measuring means 3 and 34 on the vehicle of a temperature above the predetermined threshold temperature, or reception by the receiver means 7 and 31 of control information INFO including a command to emerge from shelter sent from a remote station on the planet, for example, or the expiry of a time-delay started by the vehicle. This last embodiment is evidently suitable for protecting a vehicle during the lunar night since the duration of the lunar night is known and is-substantially constant at 14 days. In this case, the vehicle initiates a time-delay of 14 days in response to the event signalling the existence of the hostile exterior environment. The event B is then the expiry of this time-delay.

As soon as the event B occurs, the interfaces or interface subsystems that were put on standby after the vehicle took shelter are awakened or reactivated (step 17). The vehicle then emerges from shelter (step 18). In the first embodiment described, the vehicle emerges by folding up the cover 2. The vehicle folds the cover 2 by the sequence of operations indicated by reading FIGS. 1A through 1D in reverse order. In the second embodiment the vehicle emerges from shelter by leaving the garage which it previously entered for shelter.

Figure 3:
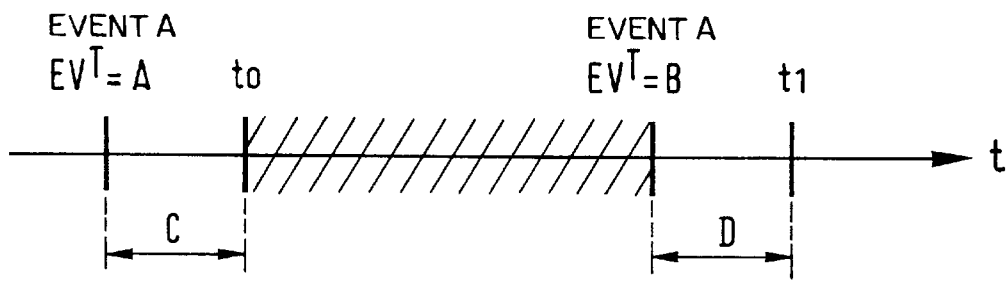
FIG. 3 is a time chart showing the chronology of the steps whereby the vehicle takes shelter and emerges from shelter of its own accord relative to events that are dependent on the exterior environment of the vehicle.

FIG. 3 is a time chart showing the successive states of the vehicle in accordance with the events A and B together delimiting a period during which the exterior environment is hostile. Before the event A, signalling the start of a period during which the exterior environment is hostile, the vehicle is in the open. In response to this event A the vehicle takes shelter. This process (for example, the deployment of the cover 2) requires a time period C. At the end of this time period C, coinciding with time t0, the vehicle is in shelter and puts its onboard resources at least partially on standby, until detection of the event B advising the vehicle that the exterior environment has become viable. In response to this event B the vehicle reactivates the resources previously placed on standby and emerges from shelter. This process (for example the folding up of the cover 2) requires a time period D expiring at t1. The cross-hatched area from time t0 through the time associated with the event B represents the duration, or second period, during which at least some of the resources of the vehicle are on standby and the vehicle is in shelter.

There is claimed:

1. Method of protecting a planetary rover vehicle, adapted to travel in a manner that is at least partially autonomous, against an exterior environment that has become hostile wherein said vehicle takes shelter and emerges from shelter of its own accord, said method comprising the steps of:

a) sensing a first event representative of hostility in said exterior environment;

b) causing said vehicle to take shelter in response to said first event thereby isolating said vehicle from said exterior environment during hostility in said exterior environment;

c) sensing a second event representative of an end in hostility in said exterior environment; and d) causing said vehicle to emerge from shelter.

2. The method claimed in claim 1, further comprising after step (b), placing resources on said vehicle at least partially on standby.

3. The method claimed in claim 1, further comprising after step (a), deploying solar energy capture means oriented towards a predicted point of appearance of the sun.

4. The method claimed in claim 1 wherein said first event is one of:

measurement by measuring means on said vehicle of a temperature below a predetermined threshold temperature, reception by receiver means on said vehicle of a command to take shelter, and the expiry of a time-delay.

5. The method claimed in claim 1 wherein said second event is one of:

measurement by measuring means on said vehicle of a temperature above a predetermined threshold temperature drop, reception by receiver means on said vehicle of a command to emerge from shelter, and the expiry of a time-delay.

6. The method claimed in claim 1, further comprising after step (b), activating heating means associated with said vehicle.

7. The method claimed in claim 1, wherein step (b) includes deploying a cover around said vehicle and step (d) includes folding said cover.

8. The method claimed in claim 1, wherein step (b) includes causing said vehicle to travel and enter a shelter provided for that purpose.

9. The method claimed in claim 2, wherein said step of placing resources on standby includes deactivating at least one of an interface and a subsystem of the vehicle.

10. The method claimed in claim 3, wherein said step of deploying a solar energy capture means includes deploying said solar energy capture means within the shelter.

11. The method claimed in claim 1, further comprising after step (b), deploying a solar energy collector which is connected to the vehicle.

12. The method claimed in claim 1, wherein said vehicle includes a temperature sensor, a signal receiver, and a clock, and said first event is one of:

measurement by said temperature sensor of a temperature below a predetermined threshold temperature;

reception by said signal receiver, of a command to take shelter; and the expiry of a time-delay.

13. The method claimed in claim 1, wherein said vehicle includes a temperature sensor, a signal receiver, and a clock, and said second event is one of:

measurement by said temperature sensor of a temperature above a predetermined threshold temperature drop;

reception by said radio receiver, of a command to emerge from shelter; and the expiry of a time-delay.

14. The method claimed in claim 1, further comprising after step (b), activating a heater connected to said vehicle.

* * * * *